No. 804,263. PATENTED NOV. 14, 1905.
A. PETELER.
VARIABLE SPEED GEARING.
APPLICATION FILED OCT. 28, 1904.
3 SHEETS—SHEET 1.
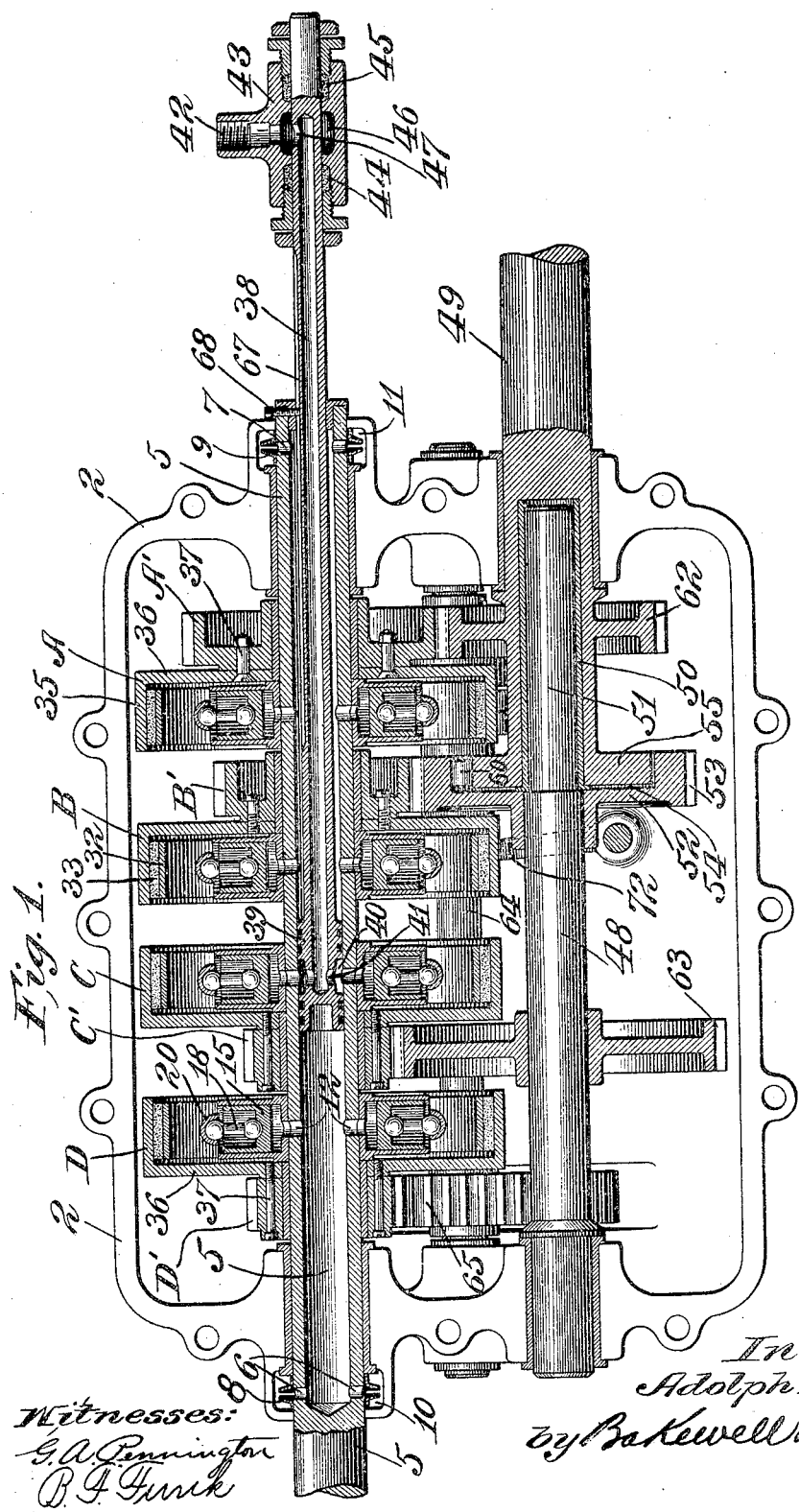

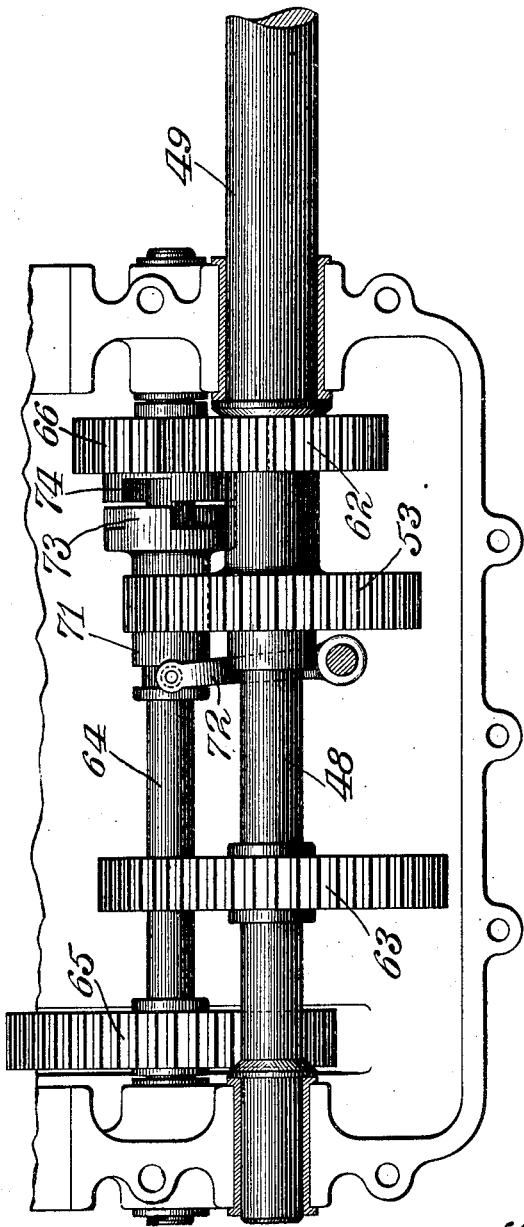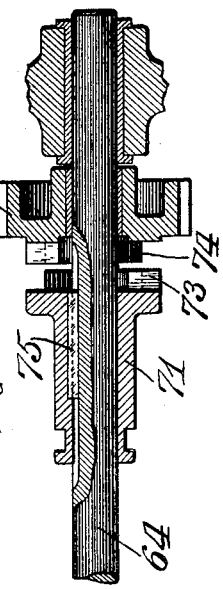

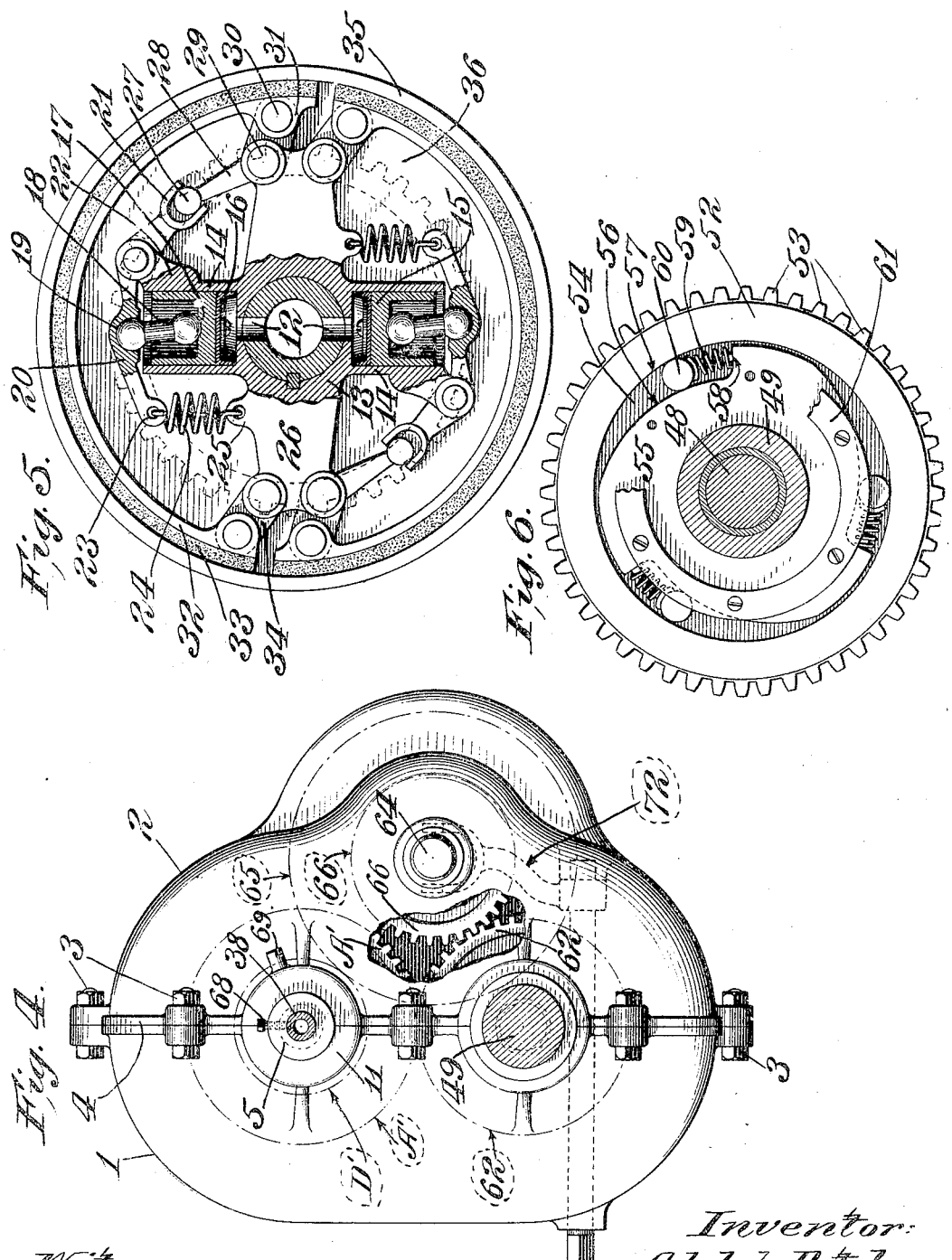

UNITED STATES PATENT OFFICE.

ADOLPH PETELER, OF ST. LOUIS, MISSOURI.

VARIABLE-SPEED GEARING.

No. 804,263.  Specification of Letters Patent.  Patented Nov. 14, 1905.

Application filed October 28, 1904. Serial No. 230,347.

*To all whom it may concern:*

Be it known that I, ADOLPH PETELER, a citizen of the United States, residing at St. Louis, Missouri, have invented a certain new and useful Improvement in Variable-Speed Gearings, of which the following is a full, clear, and exact description, such as will enable others skilled in the art to which it appertains to make and use the same, reference being had to the accompanying drawings, forming part of this specification, in which—

Figure 1 is a transverse longitudinal sectional view through a variable-speed gearing constructed in accordance with my invention. Fig. 2 is a plan view of the driven shaft, the reversing-shaft, and the coöperating gears. Fig. 3 is a view, partly in elevation and partly in section, of the clutch and a reversing-pinion. Fig. 4 is an end view of the gear-case, part of which is broken away to show the relative position of the reversing-gear in mesh with the gear on the driven shaft. Fig. 5 is a plan view, partly in section, of one of the clutches; and Fig. 6 is a plan view of the clutch used with the reversing mechanism, the side retaining-ring being broken away to illustrate one of the movable clutch elements.

This invention relates to variable-speed gearing which is adapted to be applied to a driving-shaft for varying the speed of any driven shaft; but it is particularly adapted to be employed in connection with automobiles.

One of the objects of the invention is to provide means whereby the speed of a driven shaft may be varied with respect to the speed of the driving-shaft, which driving-shaft may be driven by any suitable motor.

One of the principal objections to variable-speed gearings as heretofore generally constructed and used has been that in order to change the speed the various gears on the driving-shaft would have to be thrown into and out of mesh with complementary gears on the driven shaft, or vice versa. As the teeth came into mesh during the revolving of the driving-shaft the sudden jar resulting therefrom not only seriously impaired the machinery in time, but caused the teeth to chip and grind or wear off, so that the lives of the gears were materially shortened. With my invention I aim to overcome this objection by causing the complementary gears on the drive-shaft and driven shaft to be constantly in mesh, the gears on one of the shafts being fixed with relation thereto, while those on the other shaft are loose, so that by operating a suitable clutch fixed on the shaft on which are the loose gears said gears will be held immovable with relation to the shaft, thereby imparting motion to the gears on the other shaft. In actual practice I prefer to make the loose gears on the driving-shaft, while those on the driven shaft are fixed, and the invention as illustrated in the accompanying drawings shows such a construction.

In the preferred embodiment of my invention, as illustrated in the accompanying drawings, the reference-numeral 1 designates one half of a gear-case, while the reference-numeral 2 designates the opposite half, the two sections 1 and 2 being secured together by fastening devices 3, which pass through openings in the flanges 4. Journaled in the gear-case is a driving-shaft 5, which is hollow for a portion of its length and near its respective ends is provided with fluid-exit openings, (designated by the numerals 6 and 7.) Surrounding these openings are flanged rings 8 and 9, which are spaced apart, so as to permit fluid from the hollow shaft 5 to pass into the chambers 10 and 11 to be subsequently drawn off, as will be presently explained. At suitable intervals on the shaft 5 I arrange gears which are loose upon said shaft, but fixed with relation to coöperating clutch members, which clutch members act with fixed clutch members on the shaft 5, adapted to be operated so as to hold the gear attached to the clutch rigid with relation to the shaft 5. As the preferred construction of clutch is illustrated in Fig. 5, and as the same clutch is used in each instance for each speed, I will describe only one of them. By reference to Fig. 5 it will be observed that the shaft 5 is provided with oppositely-arranged openings 12, and keyed to the shaft and surrounding the openings 12 is a hub or casting 13, comprising one of the clutch members. This hub 13 is provided with piston-cylinders 14, arranged diametrically opposite each other and communicating with the openings 12. In each cylinder 14 is a piston 15, having a packing-disk 16, of leather or other suitable material, at one end thereof. The piston-head is provided with a slightly-concave recess 17, in which is one head of a link 18, the opposite head of the link 18 resting in a socket 19, intermediate the ends of the elbow-lever 20. Between the socket 19 and the bifurcated end 21 of the lever 20 is an arm or bracket 22, rigid with the cylinder and constituting a fulcrum for the lever 20. The end 23 of the lever 20 opposite to the end 21 is provided with an opening engaged by a coil-spring 24, which spring also engages a projection 25 on the rigid arm 26 of the hub 13. This spring 24 has a retractable tendency, so as to draw the end 23 toward the center of the hub and move the end 21 away from the center of said hub. The bifurcated end 21 of the lever 20 engages the T-head 27 of the bell-crank lever 28, which is fulcrumed at its elbow in bearings 29 on one of the arms 26. The end opposite to the end 27 of the lever 28 is provided with trunnions 30, which are journaled in bearings 31 in the segment 32, provided with a friction-facing 33, of leather or other suitable material. The opposite end of the segment 32 is connected to one of the arms 26 by a link 34. The casting 13, the oppositely-arranged cylinders 14, their pistons 15, together with their appurtenances, including the oppositely-arranged arms 26, are all non-rotatable with relation to the shaft. Thus the openings in the cylinders will at all times register with the openings 12 in the shaft 5. The two segments 32 constitute what might properly be termed an "expansible friction-ring," which engages the inner face of the peripherally-disposed flange 35 on the clutch-disk 36.

In the present case I have shown the variable-speed gearing as being adapted to provide three speeds in one direction and one speed in a reversed direction.

A designates the high-speed clutch; B, the intermediate-speed clutch; C, the low-speed clutch, and D the reversing-speed clutch. Each clutch is properly spaced on the shaft 5, which shaft is provided with openings 12 at the proper places to communicate with the cylinders of the pistons of the clutches. The high-speed clutch is fast with a large gear A', the secondary clutch with a smaller gear B', the low-speed clutch with a smaller gear C', and the reversing-clutch with a gear D' of substantially the same size as the gear C' on the clutch C. These gears are connected to the clutch members 36 by fastening devices 37. It is to be understood that the gears and the clutch members 36 are normally loose upon the shaft 5 and that they will remain in this position unless the pistons in the cylinders of the hub of the clutch are actuated to expand the segments, so as to hold the gears non-rotatable with relation to the shaft 5. I prefer to do this by fluid-pressure, and the best medium now known to me is oil, on account of its non-compressible qualities, although water or air may be employed, if desired. By reference to Fig. 1 it will be noticed that a hollow or tubular shaft 38 is slidably secured in the hollow shaft 5, and on one end of the shaft 38 is a head 39, having packing-rings therein to engage the inner walls of the hollow tube, so as to prevent leakage. Intermediate the ends of the head 39 is a circumferential groove 40, at which point are openings 41, adapted to communicate with the openings 12 in the shaft 5, so as to supply the necessary fluid to the piston-cylinders of the clutch. The fluid may be introduced from a suitable pump or supply (not shown) into the nipple 42 of the coupling 43, which is secured on the tubular shaft 38 by stuffing-boxes 44 and 45, so as to prevent leakage. The enlarged chamber 46 in the coupling 43 and which communicates with the nipple 42 also communicates with the interior of the tubular shaft 38 through an opening 47 in said shaft. This coupling 43 is non-rotatable on the shaft 38; but the peculiar formation of the chamber 46 will permit the desired pressure to be maintained in the tubular shaft 38 and in the cylinders of the particular clutch communicating with said shaft at all times. The driven shaft consists of two shaft members 48 and 49. The member 49 may drive the machinery direct, or it may be provided with a gear or pulley and act as an intermediate shaft to drive the axle or any part to which motion is to be communicated. The shaft 49 is provided with an elongated recess or tubular portion 50 to receive the constricted end 51 of the shaft member 48. Fast on the shaft member 48 is a disk 52, provided with a plurality of peripheral teeth 53, the whole comprising a gear. In the face of this gear is a recess 54 to receive a cam-disk 55 on the end of the shaft member 49. This cam-disk 55 is provided with a plurality of cam-faces 56, forming a wedge-shaped space between the cam-surfaces 56 and the inner face 57 of the flange of the disk 52, which disk 52 also constitutes a clutch member. The cam-disk 55 is also provided with shoulders 58, against each of which abuts one end of a coil-spring 59, the other end abutting against a movable clutch element 60, movable in the wedge-shaped space referred to above. These clutch elements are held in place by the side facing-ring 61. On the shaft 49 is a gear 62, which is constantly in mesh with the gear A'.

63 designates a gear fast on the shaft member 48 and constantly in mesh with the gear C'.

64 designates a reversing-shaft carrying the gear 65, constantly in mesh with the pinion D'. This shaft is journaled in the ends of the gear-casing. Near the end opposite to the end on which is the gear 65 is a gear 66, which is constantly in mesh with the gear 62.

Now if the tubular slide 38 is moved so as to cause the ports 40 to be opposite the ports of the cylinders in the clutch member C, so that the fluid can be introduced under pressure into the cylinders, the pistons in the cylinders will be moved in opposite directions, so as to cause the clutch-segments to contact with the flange of the clutch member C to hold it rigid. Inasmuch as the gear C' is fast with the clutch member C and is constantly in mesh with the gear 63, (it being understood that the shaft 5 is rotating,) the gear 63 will be rotated, which in turn will impart rotation to the shaft member 48, carrying with it the gear-disk 52, which comprises the clutch member, and will cause the clutch element 60 to bind between the flange of the disk 52 and the cam-faces 56 of the clutch-disk 55, so as to impart motion to the shaft member 49, whereby it will be driven at a relatively low speed. Now if this tubular slide 38 is moved so that the ports 40 will be opposite the ports 12 in the shaft 5, which communicate with the cylinders of the clutch B, the clutch B will be caused to operate so as to hold the gear B' fast to the shaft 5 and impart motion to the gear of which the disk 52 constitutes a part, causing the clutch-disk 55 to bind thereagainst and impart a rotary motion to the shaft member 49 at the next highest speed, it being understood that the clutch C will be thrown out. If the slide is moved to cause the ports 40 therein to permit the introduction of the fluid in the cylinders of the clutch A, this clutch will be caused to be held non-rotatable with relation to the shaft 5, but will rotate with it and impart a rotary motion to the gear A', thereby imparting motion to the gear 62 and driving the shaft 49 direct. The remaining gears, however, will not be rotated, because the rotation of the shaft 49 will cause the clutch members 60 to be received in the larger portion of the wedge-shaped space between the clutch-disks 52 and 55, and the gear will permit the maximum efficiency to be obtained from the motive power. If it is desired to reverse the direction of rotation of the shaft 49, this can be done by moving the slide to a position whereby the ports 40 will permit the entrance of the fluid through the tubular slide 38 into the ports 12 opposite the cylinders of the clutch D. Thus the clutch D will be held rigid with relation to the shaft; but in rotating with the shaft motion will be imparted to the gear D', communicating motion to the gear 65, and through the shaft 64 the gear 66 will be caused to rotate, which gear being in mesh with the gear 62 will impart a rotary movement to the shaft 49 opposite to the movement of rotation which would be imparted to the shaft 49 in the event that any of the clutches A, B, or C were thrown in operation. It is desirable that the ports 12 be arranged in such positions that they will readily discharge into the ports 12 of the shaft 5 opposite any of the clutch-cylinders, and it is contemplated to arrange the slide-tube 38 so that it will rotate with the shaft 5. This may be accomplished by providing a longitudinal groove 67 in the slide 38 for engagement by a pin 68, passing through the shaft 5. Attention is called to the fact that as soon as the slide is moved away from any of the clutch-cylinders the springs 24 will cause the pistons to recede within the cylinders and force the fluid from the cylinders into the hollow shaft 5. Provision is made for permitting the exhaustion of the fluid from this shaft 5 through the ports 6 and 7 in the respective ends of the shafts into the chambers 10 or 11, on which are the nipples 69, to which nipples may be attached a suitable tube (not shown) to convey the fluid back to the pump. The slide 38 may be controlled from a convenient point on the vehicle where the gearing is employed in connection with motor-vehicles; but as any lever mechanism may be employed for this purpose it is not deemed necessary to illustrate it in this application.

By reference to Figs. 2 and 3 it will be observed that when the high-speed clutch is operating the reversing-shaft 64, together with its gear 65, does not rotate. This is made possible by arranging a sliding clutch member 71 on the shaft 64 to be operated by a lever 72 from the front of the machine, said clutch member 71 having clutch projections 73 at one end, which are adapted to engage the clutch member 74, having corresponding recesses for the projection 73 and carried by the gear 66. When it is desired to reverse the direction of rotation of the shaft member 49, this clutch member 71 must be thrown into engagement with the clutch member 74, which clutch member, together with its gear 66, is normally loose on the shaft 64, while the clutch member 71 is keyed on the shaft 64 by the key 75; but it is permitted to slide. It will thus be apparent that the speed of a motor-vehicle or any shaft driven by the driving-shaft or the efficiency of the motor to which the shaft 5 is attached will not be impaired by the clutches B, C, and D and their corresponding gears when the clutch A is doing its work. Thus practically the same efficiency may be obtained from the motor as could be obtained if these clutches and gears were eliminated. Another advantage resulting from the construction above described is that the slide 38 being under perfect control the machine may be started and stopped without sudden jars and jolts, such as is generally present in the types of machines utilizing the present constructions of variable-speed gearing. One of the very important objections overcome by this construction is that as the teeth of all of the gears are constantly in mesh with the gears on their clutches the teeth of the gears do not have to be thrown in mesh by sliding between each other while one of the gears is rotating, the objection to which is readily apparent to any person skilled in the art, because, as is well known, this throwing of the gears into and out of mesh results in chipping the faces and corners and grinding and "chewing" them down, so that new gears must almost constantly be substituted for those worn out. Another object is that the clutch for the high speed can be instantly thrown into operation without going through the successive steps of throwing first the low-speed gears, then the intermediate-speed gears, and then the high speed, and this immediate operating of the high-speed clutch will in no wise impair the machinery.

In describing the above invention reference has generally been made to it as being applied to motor-vehicles; but I do not wish to have it understood that I limit myself to its application thereto, as it is obvious that it may be employed in connection with other machines in which power is to be derived from a driving-shaft.

By reference to Fig. 5 it will be observed that by the peculiar construction of the clutch whereby the segments 31 are caused to bind against the peripheral flange of the disk 34 an efficient clutch is provided, because after the clutch-segments are moved against the flange 35 of the clutch member 34 rotation of the hub will increase the binding tendency of the clutch-segments owing to the peculiar construction of the toggle-levers, and this binding will be maintained until pressure is relieved in the piston-cylinders.

Having thus described my invention, what I claim as new, and desire to secure by Letters Patent, is—

1. In a variable-speed gearing, the combination with a driving-shaft and a driven shaft, one of said shafts being hollow and having fluid-ports therein, castings on the hollow shaft having piston-cylinders in communication with the hollow shaft through the fluid-ports, pistons in said cylinders, clutch members loose on the hollow shaft and gears carried thereby, gears on the other shaft and in mesh with the gears on the clutch members, and means for permitting fluid to enter the cylinders in one of the clutch members to the exclusion of the others to hold the gear-carrying clutch member non-rotatable with relation to the shaft; substantially as described.

2. A variable-speed gearing, comprising a hollow shaft, a plurality of gear-carrying clutch members loosely mounted thereon, a clutch member for each of the first-named clutch members fixed on said hollow shaft and piston-cylinders in communication therewith, pistons working in said cylinders, means controlled by said pistons for frictional engagement with the loose clutch members, and fluid-controlling means for actuating said pistons to bind the two clutch members together; substantially as described.

3. A variable-speed gearing, comprising a hollow shaft, a plurality of gear-carrying clutch members loosely mounted thereon, a clutch member for each of the first-named clutch members fixed on said hollow shaft and piston-cylinders in communication therewith, pistons working in said cylinders, means controlled by said pistons for frictional engagement with the loose clutch members, and sliding fluid-controlling means for actuating said pistons to bind the two clutch members together; substantially as described.

4. A variable-speed gearing, comprising a hollow shaft, a plurality of gear-carrying clutch members loosely mounted thereon, a clutch member for each of the first-named clutch members fixed on said hollow shaft and piston-cylinders in communication therewith, pistons working in said cylinders, means controlled by said pistons for frictional engagement with the loose clutch members, and sliding fluid-controlling means comprising a hollow tube for actuating said pistons to bind the two clutch members together; substantially as described.

5. A variable-speed gearing, comprising a hollow shaft, a plurality of gear-carrying clutch members loosely mounted thereon, a clutch member for each of the first-named clutch members fixed on said hollow shaft and piston-cylinders in communication therewith, pistons working in said cylinders, means controlled by said pistons for frictional engagement with the loose clutch members, sliding fluid-controlling means comprising a hollow tube having a head at one end and binding against the inner walls of the hollow shaft, said tube having outlet-ports adapted to register with the ports in the shaft, and a groove intermediate the ends of the head and surrounding the outlet-ports in said tube; substantially as described.

6. A variable-speed gearing, comprising a tubular driving-shaft, a driven shaft, fluid-controlled clutches on the hollow driving-shaft, a gear carried by each clutch, gears on the driven shaft and in mesh with the gears on the clutches, a third shaft, a gear carried thereby constantly in mesh with one of the gears on the drive-shaft, and another gear constantly in mesh with a gear on the driven shaft; substantially as described.

7. A variable-speed gearing, comprising a tubular driving-shaft, a driven shaft, fluid-controlled clutches on the hollow driving-shaft, a gear carried by each clutch, gears on the driven shaft and in mesh with the gears on the clutches, a third shaft, a gear carried thereby constantly in mesh with one of the gears on the drive-shaft, another gear constantly in mesh with a gear on the driven shaft, the last-named gear being loose on the third shaft, and a clutch for binding the last-named gear to the third shaft; substantially as described.

8. In a variable-speed gearing, the combination with a driving-shaft and a driven shaft comprising two members alining with each other, clutch members on the respective driving-shaft members, one of said clutch members comprising a disk having a peripheral flange with teeth, the other clutch member having a plurality of cam-faces, interposed between which and the flange on the opposite clutch member are friction devices, a clutch on the driving-shaft, a gear carried thereby and constantly in mesh with the gear-tooth clutch member, said clutch and the gear carried thereby being normally loose on the driving-shaft, and means for binding the clutch and its gear to the shaft; substantially as described.

9. In a variable-speed gearing, the combination with a driving-shaft having a central, longitudinal, hollow portion with exit-ports at suitable points along its length, fluid-actuated clutches carried by said driving-shaft, gears carried by the clutches for engagement with gears on a driven shaft, a sliding tube in the bore of the driving-shaft and rotatable with the driving-shaft, said sliding tube being connected to a suitable fluid-supply, and said tube having exit-ports adapted to supply fluid from the tube through the ports of the driven shaft into the clutch members; substantially as described.

10. In a variable-speed gearing, the combination with a driving-shaft having a central longitudinal hollow portion with exit-ports at suitable points along its length, fluid-actuated clutches carried by said driving-shaft and gears carried by the clutches for engagement with gears on a driven shaft, a sliding tube in the bore of the driving-shaft and connected to a suitable fluid-supply, said tube having exit-ports adapted to supply fluid from the tube through the ports of the driven shaft into the clutch members, and drain-cups separate from the driving-shaft but at all times communicating therewith; substantially as described.

11. In a variable-speed gearing, the combination with a hollow shaft, a driven shaft comprising two members, a clutch member on each thereof and coöperating with a clutch member on the opposite shaft member, gears rigid with the hollow shaft, teeth on one of the clutch members, loose gears on the driving-shaft each of which meshes with one of the gears on the driven shaft, clutches for holding the gears on the driving-shaft immovable with relation thereto, means for actuating said clutches, a clutch on said driving-shaft, a gear carried thereby, a third shaft, a fixed gear on the third shaft and constantly in mesh with the gear on the last-named clutch, a loose gear on the third shaft and constantly in mesh with one of the gears on the driven shaft, and means for holding the loose gear on the third shaft fixed thereto; substantially as described.

12. In a variable-speed gearing, the combination with a gearing having clutches coöperating therewith, a fluid-controlling device coöperating with the gearing to actuate parts of the clutches thereof, said device being rotatable with one of the shafts, a coupling connected to said device and having an enlarged recess surrounding an opening in said device; substantially as described.

In testimony whereof I hereunto affix my signature, in the presence of two witnesses, this 24th day of October, 1904.

ADOLPH PETELER.

Witnesses:
 B. F. FUNK,
 GEORGE BAKEWELL.